(12) United States Patent
Lichtenhan et al.

(10) Patent No.: US 6,927,270 B2
(45) Date of Patent: Aug. 9, 2005

(54) PROCESS FOR THE FUNCTIONALIZATION OF POLYHEDRAL OLIGOMERIC SILSESQUIOXANES

(75) Inventors: Joseph D. Lichtenhan, San Juan Capistrano, CA (US); Joseph J. Schwab, Huntington Beach, CA (US); Yi-Zhong An, Fountain Valley, CA (US); Qibo Liu, Irvine, CA (US); Timothy S. Haddad, Lancaster, CA (US)

(73) Assignee: Hybrid Plastics LLP, Fountain Valley, CA (US)

( * ) Notice: Subject to any disclaimer, the term of this patent is extended or adjusted under 35 U.S.C. 154(b) by 0 days.

(21) Appl. No.: 10/186,318

(22) Filed: Jun. 27, 2002

(65) Prior Publication Data

US 2003/0055193 A1 Mar. 20, 2003

Related U.S. Application Data

(60) Provisional application No. 60/301,544, filed on Jun. 27, 2001.

(51) Int. Cl.[7] .............................. C08G 77/06; C07F 7/07
(52) U.S. Cl. .............................. 528/12; 528/25; 528/26; 528/30; 528/32; 528/34; 556/460; 556/462; 556/466; 556/467
(58) Field of Search .............................. 528/12, 25, 26, 528/30, 32, 34, 33; 556/460, 462, 466, 467

(56) References Cited

U.S. PATENT DOCUMENTS

| | | | | |
|---|---|---|---|---|
| 5,484,867 A | * | 1/1996 | Lichtenhan et al. ........... 528/9 |
| 5,858,544 A | * | 1/1999 | Banaszak Holl et al. ... 428/447 |
| 5,939,576 A | * | 8/1999 | Lichtenhan et al. ........ 556/460 |
| 6,329,490 B1 | * | 12/2001 | Yamashita et al. ............ 528/42 |

FOREIGN PATENT DOCUMENTS

| | | | | |
|---|---|---|---|---|
| WO | WO 01/10871 A1 | * | 2/2001 | ............. C07F/7/08 |

* cited by examiner

Primary Examiner—Jeffrey B. Robertson
(74) Attorney, Agent, or Firm—David Jaffer; Pillsbury Winthrop Shaw Pittman LLP

(57) ABSTRACT

Efficient processes have been developed for the cost effective functionalization of polyhedral oligomeric silsesquioxane-silanols (POSS-Silanols) and for the manufacture of polyfunctional polyhedral oligomeric silsesquioxanes. The processes utilize the action of bases or acids on silane coupling agents. The preferred process utilizes base to promote the silylation of POSS-Silanols of the formula $[(RSiO_{1.5})_n(R(HO)SiO_{1.0})_m]_{\Sigma\#}$ with silane coupling agents to form POSS species with functionalized incompletely condensed nanostructures $[(RSiO_{1.5})_n(R(YSiR_2O)SiO_{1.0})_m]_{\Sigma\#}$ or functionalized completely condensed nanostructures $[(RSiO_{1.5})_n(YSiO_{1.5})_1]_{\Sigma\#}$. The process can alternately be conducted with acids. A second process utilizes base to alkylate POSS-Silanols with functionalized alkyl halides. A third related process utilizes base to react with silane coupling agents to form polyfunctional, fully condensed POSS species of formula $[(YSiO_{1.5})_n]_{\Sigma\#}$. This process can also alternately be conducted under acidic conditions. Each of the processes result in new POSS compositions that can undergo additional desirable chemical reactions or which are directly suitable for polymerization or grafting into polymeric materials. POSS frameworks containing silanol and other reactive functionalities suitable for polymerizations have previously been described as valuable co-monomers in polymerizations and as feed-stocks for the preparation of a diverse number of chemical agents that are useful in polymeric materials in biological applications, and for the modification of surfaces.

11 Claims, No Drawings

PROCESS FOR THE FUNCTIONALIZATION OF POLYHEDRAL OLIGOMERIC SILSESQUIOXANES

This application claims priority from U.S. Provisional Patent Application Ser. No. 60/301,544, filed Jun. 27, 2001.

FIELD OF THE INVENTION

The present invention relates to processes for making functionalized Polyhedral Oligomeric Silsesquioxanes.

BACKGROUND OF THE INVENTION

This disclosure describes methods that enable the selective functionalization and assembly of the silicon-oxygen frameworks in polyhedral oligomeric silsesquioxane (POSS) cage molecules. It is desired to selectively manipulate the frameworks of POSS compounds because they are useful as chemical species that can be further converted or incorporated into a wide variety of chemical feed-stocks useful for the preparation of catalyst supports (Weidner et al., "Organooligosilsesquioxanes" U.S. Pat. No. 5,047,492; U.S. patent application Ser. No. 60/147,435; Vogt, L. H., Brown, J. F., *Inorg. Chem.*, 1963, 2, 189–92), monomers, polymers, and as solubilized forms of silica that can be used to replace fumed and precipitated silicas or in biological applications, and for surface modification. When incorporated into a polymeric material POSS can impart new and improved thermal, mechanical and physical properties to common polymeric materials. (See Schmid, G.; Pugin, R.; Malm, J-O.; Bovin, J-O. "Silsesquioxanes as Ligands for Gold Clusters," *Eur. J. Inorg. Chem.* 1998, pp813–817. Developed a process for the cornercapping of trisilanols with silane reagents MeO)3Si(CH2)3SH using p-toluenesulfonic acid. This is a process that was necessary to enable corner capping with this functionality. Note that Marsmann et al. have reported the synthesis of a similar thiol-functionalized POSS by co-hydrolysis of trtichloro(n-propyl)silane with the (3-mercaptopropyl)trimethoxysilane in a 7:1 ratio. See B. J. Hendan, H. C. Marsmann, *J. Organomet. Chem.* 1994, 483, pp33 and U.Dittmar, B. J. Hendan, U. Floerke, H. C. Marsmann, *J. Organomet. Chem.* 1995, 485, p185.)

Prior art has shown that a variety of POSS-silanol frameworks can be functionalized via silation using a variety of silyl and metal-based agents. ((a) Feher et al., "Silsesquioxanes as Models for Silica Surfaces", *J. Am. Chem. Soc.* 1989, 111, 1741–48. (b) Weidner et al., "Organooligosilsesquioxanes" U.S. Pat. No. 5,047,492. (c) Brown, J. F., Vogt, L. H., "The Polycondensation of Cyclohexylsilanetriol" *J. Am. Chem. Soc.* 1965, 87, 4313–24.) While synthetically useful, this prior functionalization method is imperfect in that it requires the use of dry solvents and the presence of proton accepting bases (e.g. amines) to produce the desired product in high yield. In addition the prior method is cumbersome and costly in that additional precautions must be taken when handling chlorosilanes and related metal halides. Furthermore the prior art was effective only for certain functionalities and in particular did not allow the use of amino, epoxy, and hydrido functionalized silane coupling agents. Later art reported a limited usage of alkoxy silane coupling agents in reaction with POSS-Silanols in the presence of acid to produce the desired fully condensed functionalized POSS systems $[(RSiO_{1.5})_n(YSiO_{1.5})_1]_{\Sigma\#}$. (See Schmid, G.; Pugin, R.; Maim, J-O.; Bovin, J-O. "Silsesquioxanes as Ligands for Gold Clusters," *Eur. J. Inorg. Chem.* 1998, pp813–817; See B. J. Hendan, H. C. Marsmann, *J. Organomet. Chem.* 1994, 483, pp33 and U.Dittmar, B. J. Hendan, U. Floerke, H. C. Marsmann, *J. Organomet. Chem.* 1995, 485, p185.) This advancement was however found to be of modest utility in that it does not afford the desired $[(RSiO_{1.5})_n(YSiO_{1.5})_1]_{\Sigma\#}$ products in high yield and free from resinous byproduct contaminates.

Therefore an improvement of the prior art was necessary to enable the economical and commercial-scale functionalization of POSS-silanols from low-cost and safe (non halogenated) coupling agents bearing the a widest possible range of functionalities and leaving groups. In the course of development of an improved functionalization method, a discovery was made that enabled the efficient (one-step) assembly of polyfunctional POSS systems from these same coupling agents. The latter discovery directly resulted in many new and previously only theorized POSS compositions.

It should also be noted that indirectly related prior art has reported that bases such as NaOH, KOH, etc. can be used to both catalyze the polymerization of fully condensed POSS $[(RSiO_{1.5})_n]_{\Sigma\#}$ into lightly networked polysilsequioxane resins $[RSiO_{1.5}]_\infty$ or to convert selected polysilsesquioxane resins $[RSiO_{1.5}]_\infty$ into fully condensed POSS structures $[(RSiO_{1.5})_n]_{\Sigma\#}$. ((a) Hybrid Plastics U.S. Pat. Pending Ser. No. 60/147,435. (b) Vogt, L. H., Brown, J. F., *Inorg. Chem.*, 1963, 2, 189–92) This prior art does not afford the selective assembly of POSS nanostructures from highly functionalized silane coupling agents (e.g. $YSiX_3$) nor does it afford the functionalization of POSS Silanols with functionalized silane coupling agents. Furthermore the prior art does not provide methods of producing POSS systems suitable for functionalization and subsequent polymerization or grafting reactions. This oversight in the prior art is reflective of the fact that the invention of POSS-based reagents, monomers and polymer technology post-dates this prior art by approximately three decades. Hence POSS compositions and processes relevant to the types of systems desired for POSS monomer/polymer technology were not envisioned in the prior art. Additionally the prior art does not demonstrate the action of bases on silane, silicate, or silsesquioxane feedstocks suitable for producing low-cost and high purity POSS systems. In contrast to the prior art (Brown et al., and Marsmann et al.) the processes taught here and the compositions claimed specifically enable the development of lower cost, high purity POSS systems bearing functionalities useful as derivitizable chemical reagents and feedstocks.

SUMMARY OF THE INVENTION

This invention teaches three processes that enable the economical and commercial scale functionalization of POSS Monomers and POSS Reagents from readily available and low-cost feedstocks. The first process preferentially uses base to promote the silylation of POSS-Silanols of the formula $[(RSiO_{1.5})_n(R(HO)SiO_{1.0})_m]_{\Sigma\#}$ with silane coupling agents of the type $XSiR_2Y$, $X_2SiRY$, $X_3SiY$, $XSiRY_2$, $XSiY_3$, $X_2SiY_2$, to form POSS species with functionalized incompletely condensed nanostructures $[(RSiO_{1.5})_n(R(YSiR_2O)SiO_{1.0})_m]_{\Sigma\#}$ or functionalized completely condensed nanostructures $[(RSiO_{1.5})_n(YSiO_{1.5})_1]_{\Sigma\#}$, where Y is phosphino, alkylhalide, amido, amine, epoxide, mercapto, acrylic, methacrylic, styrenic, vinyl, olefinic, nitrile, cyanate, silylhydride, anhydride, ester, or groups attached to alkyl or aryl groups and where the base promotes the loss of X where X is alkoxide, halide, hydroxide, or hydride. The first process can alternately be conducted with acids. The second process utilizes base to alkylate POSS-Silanols with functionalized alkyl halides of the type XRY and organic acid chlorides of the type XC(O)RY to form functionalized incompletely condensed and functionalized completely condensed systems comprising POSS silylethers, and POSS silylesters of formula $[(RSiO_{1.5})_n(R(YRO)SiO_{1.0})_m]_{\Sigma\#}$ $[(RSiO_{1.5})_n(R(YRC(O))SiO_{1.0})_m]_{\Sigma\#}$ or functionalized completely condensed nanostructures $[(RSiO_{1.5})_n(YRO Si_{1.5})_1]_{\Sigma\#}$, $[(RSiO_{1.5})_n(YRC(O)SiO_{1.5})_1]_{\Sigma\#}$. The third process utilizes base to react with silane coupling agents of the type $X_3SiY$, to form polyfunctional, fully condensed POSS species of formula $[(YSiO_{1.5})_n]_{\Sigma\#}$.

DETAILED DESCRIPTION OF THE INVENTION

Definition of Formula Representations for POSS Nanostructures:

For the purposes of explaining this invention's processes and chemical compositions the following definition for representations of nanostructural-cage formulas is made:

Polysilsesquioxanes are materials represented by the formula $[RSiO_{1.5}]_\infty$ where $\infty$=degree of polymerization within the material and R=organic substituent (H, cyclic or linear aliphatic or aromatic groups that may additionally contain reactive functionalities such as alcohols, esters, amines, ketones, olefins, ethers or halides). Polysilsesquioxanes may be either homoleptic or heteroleptic. Homoleptic systems contain only one type of R group while heteroleptic systems contain more than one type of R group.

POSS nanostructure compositions are represented by the formula:

$[(RSiO_{1.5})_n]_{\Sigma\#}$ for homoleptic compositions $[(RSiO_{1.5})_n(R'SiO_{1.5})_m]_{\Sigma\#}$ for heteroleptic compositions $[(RSiO_{1.5})_n(R'XSiO_{1.0})_m]_{\Sigma\#}$ for functionalized heteroleptic compositions $[(XSiO_{1.5})]_{\Sigma\#}$ for homoleptic silicate compositions In all of the above R is the same as defined above and X includes but is not limited to OH, Cl, Br, I, alkoxide (OR), acetate (OOCR), peroxide (OOR), amine ($NR_2$) isocyanate (NCO), and R. The symbols m and n refer to the stoichiometry of the composition. The symbol $\Sigma$ indicates that the composition forms a nanostructure and the symbol # refers to the number of silicon atoms contained within the nanostructure. The value for # is usually the sum of m+n. It should be noted that $\Sigma\#$ is not to be confused as a multiplier for determining stoichiometry, as it merely describes the overall nanostructural characteristics of the POSS system (aka cage size).

Example of Polysilsesquioxane Resins $[RSiO_{1.5}]_\infty$

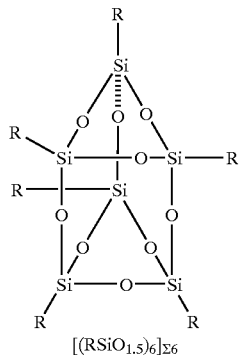

$[(RSiO_{1.5})_6]_{\Sigma 6}$

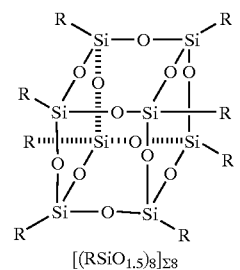

$[(RSiO_{1.5})_8]_{\Sigma 8}$

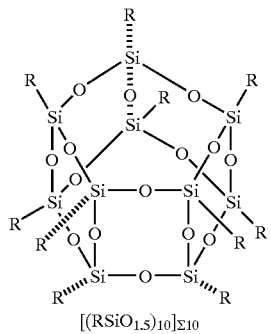

$[(RSiO_{1.5})_{10}]_{\Sigma 10}$

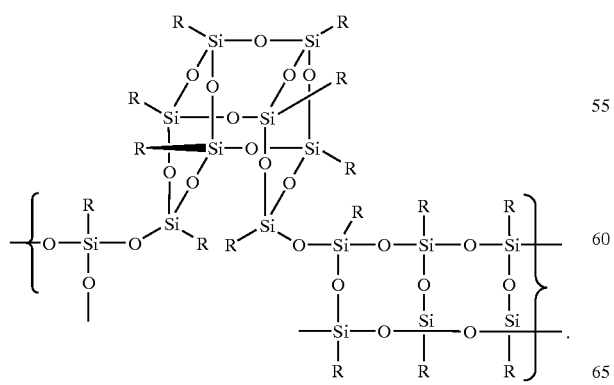

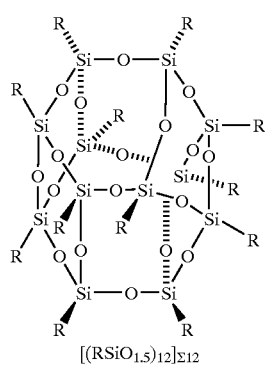

$[(RSiO_{1.5})_{12}]_{\Sigma 12}$

Examples of Homoleptic POSS Systems
$[(RSiO_{1.5})_n]_{\Sigma\#}$

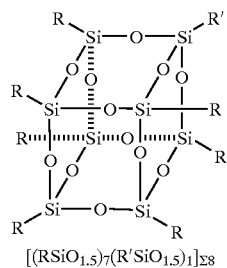

$[(RSiO_{1.5})_7(R'SiO_{1.5})_1]_{\Sigma 8}$

Example of a Heteroleptic POSS System
$[(RSiO_{1.5})_n(R'SiO_{1.5})_m]_{\Sigma\#}$

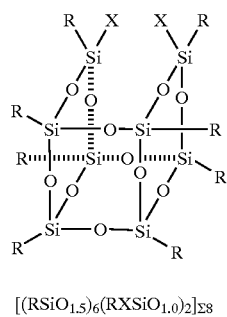

$[(RSiO_{1.5})_6(RXSiO_{1.0})_2]_{\Sigma 8}$

Example of a Functionalized Homoleptic POSS System $[(RSiO_{1.5})_n(RXSiO_{1.0})_m]_{\Sigma\#}$

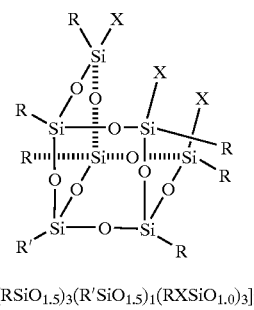

$[(RSiO_{1.5})_3(R'SiO_{1.5})_1(RXSiO_{1.0})_3]_{\Sigma'}$

Example of a Functionalized Heteroleptic POSS System $[(RSiO_{1.5})_n(R'SiO_{1.5})_m(RXSiO_{1.0})_p]_{\Sigma\#}$

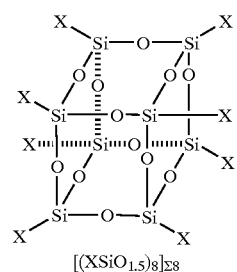

$[(XSiO_{1.5})_8]_{\Sigma 8}$

Example of a Polyhedral Oligomeric Silicate System $[(XSiO_{1.5})_n]_{\Sigma\#}$ General Process Variables Applicable to all Processes:

As is typical with chemical processes there are a number of variables that can be used to control the purity, selectivity, rate and mechanism of any process. Variables influencing the process for the conversion of POSS Silanols and silane coupling agents into functionalized POSS structures include but are not be limited to the following: chemical class of base, chemical class of acid, size and type of silicon-oxygen ring contained in each POSS nanostructure, effect of the organic substituents located on the reagents and POSS, process temperature, process solvent, stoichiometry of base (or acid) and the presence of a catalyst. Each of these variables is briefly discussed below.

Co-Reagent Promoters

Specific chemical agents can be utilized to promote or enhance the effectiveness of the bases (or acids) utilized in the processes. Specifically, nucleophilic base mixtures that work in combined fashion to firstly solubilize the silsesquioxane and secondly promote formation of the POSS nanostructure. Examples of such systems may include but are not limited to KOR where OR is an alkoxide, RMgX which include all common Grignard reagents, alkaline or alkaline earth halides such as LiI, or any of a variety of molten or fused salt media. In a similar fashion co-bases such as $[Me_3Sn][OH]$ and $[Me_4Sb][OH]$ have been shown to promote chemical transformations of POSS systems yet have not been utilized as a co-reagent in the formation of POSS cages. Alternatively, electrophilic promoters such as zinc compounds, (i.e. $ZnI_2$, $ZnBr_2$, $ZnCl_2$, $ZnF_2$, etc.) aluminum compounds, (i.e. $Al_2H_6$, $LiAlH_4$, $AlI_3$, $AlBr_3$, $AlCl_3$, $AlF_3$, etc.) boron compounds including (i.e. $RB(OH)_2$, $BI_3$, $BBr_3$, $BCl_3$, $BF_3$, etc.) which are known to play important roles in the solubiization and ring-opening polymerization of cyclic silicones and in the ring-opening of polyhedral oligomeric silsesquioxanes.

Chemical Bases and Acids

The purpose of the base or acid is to cleave the silicon-oxygen (Si—O) or oxygen-hydrogen (O—H) bonds in the various POSS and silane structures. The exact type of base or acid, its hydration sphere, concentration, and solvent interactions all play important counterion roles in the effectiveness. Proper understanding and control of conditions enable the selective cleavage and/or assembly of silsesquioxane, silicate, POSS, and POSS Silanol systems in the desired manner.

There are a wide range of bases that can be used in the processes and these include but are not limited to: hydroxide $[OH]^-$, organic alkoxides $[RO]^-$, carboxylates $[RCOO]^-$, amides $[RNH]^-$, carboxamides $[RC(O)NR]^-$, carbanions $[R]^-$ carbonate $[CO_3]^{-2}$, sulfate $[SO_4]^{-2}$, phosphate $[PO_4]^{-3}$, biphosphate $[HPO_4]^{-2}$, phosphourus ylides $[R_4P]^-$, nitrate $[NO_3]^-$, borate $[B(OH)_4]^-$, cyanate $[OCN]^-$, fluoride $[F]^-$, hypochlorite $[OCl]^-$, silicate $[SiO_4]^{-4}$, stannate $[SnO_4]^{-4}$ basic metal oxides (e.g. $Al_2O_3$, CaO, ZnO etc.), amines $R_3N$ and amine oxides $R_3NO$, and organometallics (e.g. RLi, $R_2Zn$, $R_2Mg$, RMgX etc.). Furthermore, the processes taught here are not limited to the above-mentioned bases; rather any reagent can be employed which produces a pH spanning the range from 7.1 to 14.

There are a wide range of acids that can be used in the processes and these include but are not limited to: sulfonic acids, mineral acids, super acids and water.

Alternatively mixtures of bases or acids may also be utilized to carryout the process. One advantage of such an approach is that each of the mixture components can serve different functions. For example, in a mixed base system one base can be used to cleave silicon-oxygen bands or silicon-X bands while a second base is used to assemble the POSS structure. Thus synergies can exist amongst several types of bases and these can be utilized to the advantage and refinement of these processes.

Silicon-oxygen Ring Size, Ring Type and Cage Sizes

The processes discussed in this disclosure are not limited to the formation of specific sizes of POSS cages (i.e., $\Sigma\#$ in $[(RSiO_{1.5})_n]_{\Sigma\#}$). Similarly the processes should not be limited to specific types of silanes or POSS-Silanols. They can be carried out to manufacture POSS cages containing four to eighteen or more silicon atoms in the silicon-oxygen framework. It has been noted that the silicon-oxygen ring size contained within such POSS systems does however affect the rate at which cage silicon-oxygen ring opening can occur. For example rings containing three silicon atoms and three oxygen atoms open faster than the larger rings containing 4 silicon atoms and 4 oxygen atoms. The relative rate for the opening of POSS silicon-oxygen rings appears to be faster for six membered rings with three silicon atoms than for eight membered rings with four silicon atoms which are in turn faster than ten member rings with five silicon atoms and twelve member rings with six silicon atoms. Selective ring opening processes therefore can be controlled through the use of the appropriate base and knowledge of this information allows the user of these processes to control selective formation of POSS molecules.

Effect of the Organic Substituent, Process Solvents and Process Temperatures

The processes described in this disclosure are not limited to POSS systems bearing specific organic groups (defined as R) attached to the silicon atom of the silicon-oxygen ring systems. They are amenable to organosilanes and POSS-Silanols bearing a wide variety of organic groups. (R=as previously defined) and functionalities (X=as previously defined). The organic substituent R does have a large effect on the solubility of both the final product and the starting POSS material. Therefore, it is envisioned that the different solubilities of the starting organosilane and POSS-Silanol and of the POSS products can be used to facilitate the separation and purification of the final reaction products. We currently find no limitation of the process with respect to the type of solvent used and the processes have been carried out in common solvents including but not limited to alcohols, ketones, ethers, dimethylsulfoxide, $CCl_4$, $CHCl_3$, $CH_2Cl_2$, fluorinated solvents, aromatics (halogenated and nonhalogenated), aliphatic (halogenated and nonhalogenated). Variations of the taught processes can be carried out in supercritical fluids including but not limited to $CO_2$, $H_2O$, and propane. The variables of solvent type, POSS concentration, and process temperature should be utilized in the standard way to match the specific cage opening process to the equipment available. Preferred solvents for the processes are tetrahydrofuran, methylisobutyl ketone, methanol, ethanol, hexane, acetic acid, and toluene. In many cases the solvent is an integral component of the process, which to enables the base to act on the specific organosilane or POSS-Silanol system, hence solvent effects greatly influence the degree of ionization of the base used in these processes.

Process I: Formation of Functionalized POSS from POSS-Silanols and Organosilanes.

The corner capping reaction of POSS-Silanols with silane coupling agents is the primary method for delivering a variety of Y-type functionalities to form fully condensed POSS Monomers and POSS Reagents. While prior art by Brown et al. and later by Feher taught that cornercapping of POSS-Silanols could be accomplished with trichlorosilanes bearing nonreactive groups and under acidic conditions, neither taught that the conercapping could be accomplished with reactive functionalities suitable for subsequent reactive grafting or polymerization. Furthermore, the prior art methods were not amenable to cornercapping under basic conditions.

In contrast, the present invention teaches a method for cornercapping POSS-Silanols under basic conditions, which is a simpler and more desirable process for the economic manufacture of functionalized POSS-Monomers and POSS-Reagents. This method can be carried out at room temperature using either low or high concentrations of POSS Silanols (0.05 and 1.0 Molar). Higher concentrations are preferred as the reaction completes in less time and more cost effectively at higher concentrations. A variety of bases, such as lithium, sodium and potassium hydroxide, can be employed and are all effective. The preferred bases include ammonium hydroxides such as tetramethyl ammonium, tetraethyl ammonium, tetrabutyl ammonium, benzyltrimethyl ammonium hydroxides. The choice of the base to be employed per each cornercapping reaction can be varied and is generally selected relative to solubility and stability of reagents and products relative to each other and for ease of product isolation. In general, the cornercapping reactions proceed using a solvent that facilitates isolation of products and with a 1–20 mole % concentration of base (e.g. $LiOH\cdot H_2O$) or a 0.5–30 mole % concentration of ammonium base with the 0.5 to 3.0 mole % range being preferred to effect optimal reaction speed and product purity. High yields and product purity result from these base-assisted cornercapping reactions in part because of the stability of POSS-Silanols to base (e.g. LiOH) for several hours in the absence of corner capping reagent. However, extended exposure (approx. 17 hrs) of POSS-Silanols to base can promote the elimination of water from the POSS-silanols and the formation of structurally related POSS-Silanols $[(RSiO_{1.5})_n(R(HO)SiO_{1.0})_m]_{\Sigma\#}$ or fully condensed cage species $[(RSiO_{1.5})_n]_{\Sigma\#}$.

Scheme 1 below illustrates the reaction of cornercapping POSS-Silanols to form fully condensed Functionalized POSS-Monomers and POSS-Reagents.

Scheme 1

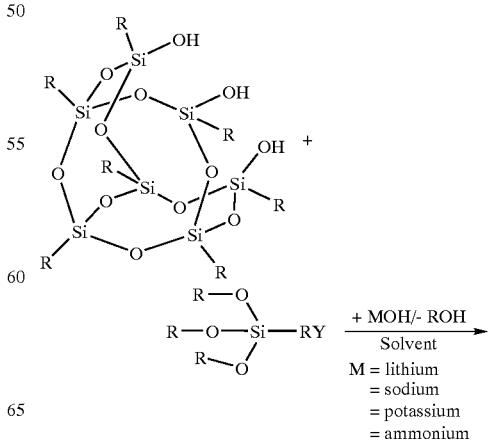

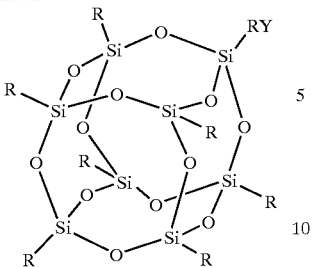

The silation reaction of POSS-Silanols with silane coupling agents is the primary method for delivering a variety of Y-type functionalities to incompletely condensed POSS Monomers and Reagents. Examples of this reaction are illustrated below in Scheme 2.

Scheme 2

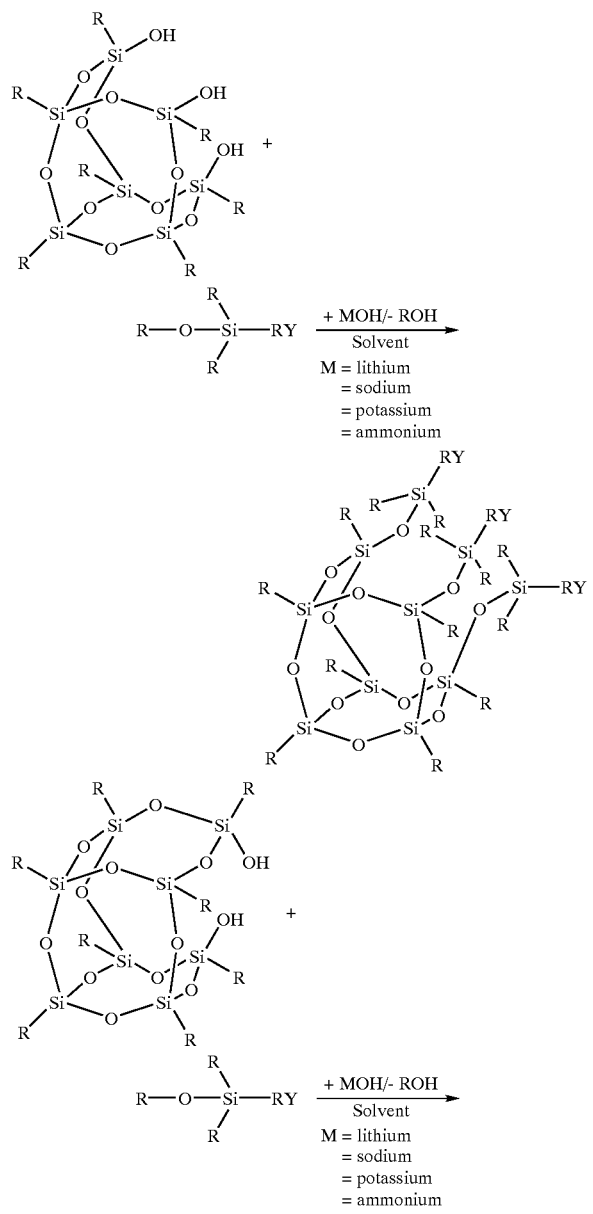

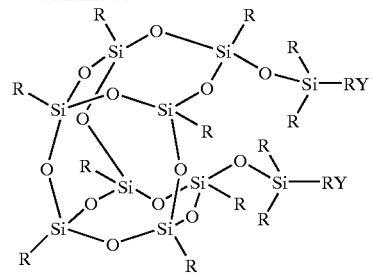

The above-described methods to carryout corner capping reactions and silations provide an avenue to functiontionalized POSS systems that cannot otherwise be easily or economically prepared in commercial volumes. For example, under the prior art using acidic conditions and heating of the reaction medium, special care must be taken during the corner capping or silation reaction using acrylic functionalized silanes to avoid polymerization of the desired acrylate-functionalized POSS-monomer. Acrylic POSS-monomers are easily polymerized via byproducts from the corner capping reaction such as HCl, or by external factors such as heat, light, or atmospheric oxygen. The importance of these external factors on yield and product purity is greatly reduced via the methods of the present invention. Additionally, cornercapping and silations with amino functionalized silanes were not possible under prior art unless additional protection/deprotection steps were taken to preserve the amino functionality from protonation under the acidic conditions. Under the base-assisted conditions disclosed herein, cornercapping and silation of POSS-Silanols with amino silanes are readily accomplished at room temperature in one simple step.

The cornercapping and silation of POSS-Silanols can be accomplished with metals other than silicon (e.g. Si, Ti, Zr) and a variety of reactive functionalites useful for subsequent grafting or polymerization reactions can be incorporated. The cornercapping and silation process is unique in that it selectively enables the functionalization of one and only one corner of the silsesquioxane cage. The ability to selectively control the placement of functionality on a nanostructure is an unprecedented capability.

In the cornercapping and silation process a POSS-Silanol is dissolved or suspended in a technical grade solvent such as THF, hexane, acetone, alcohol or methylisobutyl ketone, and a stoichiometric amount of organosilane is subsequently added to the mixture, followed by addition of an aqueous or alcoholic solution of base. Sufficient base should be added to the reaction mixture so as to produce a basic solution (pH 7.1–14). The reaction mixture is stirred at room temperature for 3 hours followed by crashing into methanol. During this time the desired functionalized POSS products are separated through filtration of a precipitate or are removed from the reaction solvent by extraction, crystallization, or solvent evaporation.

Hydroxide [OH]$^-$ bases are highly effective at concentrations of 1–10% molar equivalents (the preferred range is 2–5 molar % equivalents) per mole of POSS-Silanol for the cornercapping and silation of POSS-Silanols. In particular, hydroxide bases (e.g. sodium hydroxide, potassium hydroxide, lithium hydroxide, benzyltrimethylammonium hydroxide, tetramethyl ammonium hyrdoxide etc) are highly effective for the process. Milder bases such as acetate and carbonate are less effective unless used in combination with a stronger base. It is also recognized that the use of other co-reagents may be used to promote the formation of POSS species from this process.

Specific examples of reactive silane functionalities that can be incorporated onto POSS-Silanols include but are not limited to the following:

| R-Y |
|---|
| Hydride |
| Acrylic, Methacrylic, Styrenic |
| Aliphatic and Aromatic Epoxy |
| Alpha Olefin, Vinyl, and Strained Olefins |
| Aliphatic and Aromatic Amine |
| Aliphatic and Aromatic Esters |
| Aliphatic and Aromatic Alcohols |
| Mercapto |
| Aliphatic and Aromatic Imides |
| Aliphatic and Aromatic Halides |
| Cyanate Esters |
| Phosphines and Phosphates |
| Aliphatic and Aromatic Ethers |
| Aliphatic and Aromatic Isocyantes |
| Aliphatic and Aromatic Hydrocarbons |

Process II: Formation of Functionalized POSS from POSS-Silanols and Functional Hydrocarbons.

The alkylation reaction of POSS-Silanols with functionalized organo reagents is an alternative method for delivering a variety of reactive functionalities to incompletely condensed POSS-Silanols to form POSS-monomers and POSS-reagents desirable for subsequent polymerization or derivatization chemistry. Process II is similar to Process I in that it affords the selective functionalization of only one corner (or side) of the POSS nanostructure. The reaction schemes for the alkylation of POSS-Silanols to form incompletely condensed Functionalized POSS-Monomers and POSS-Reagents is illustrated below in Scheme 3.

Scheme 3

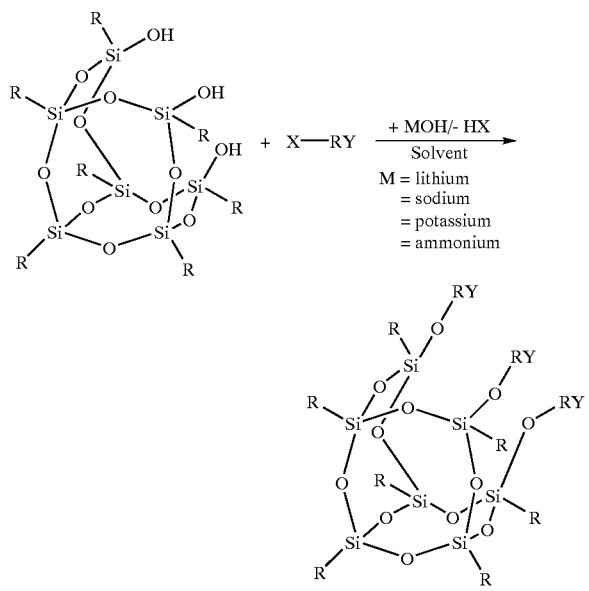

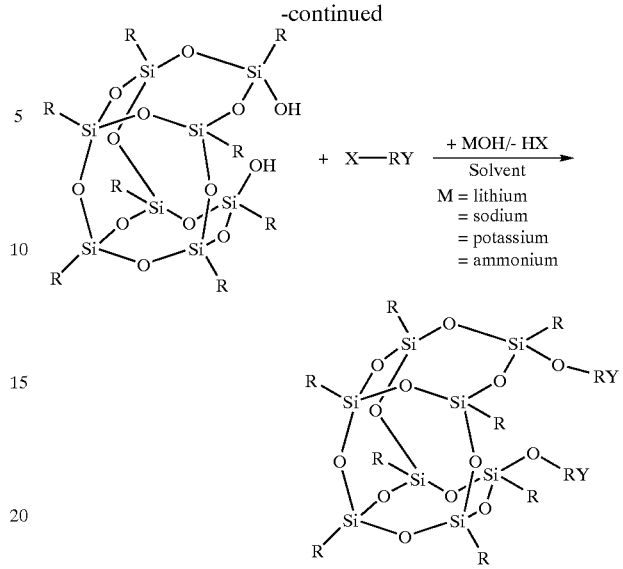

Process II. Alkylation of POSS-Silanols to Form Incompletely Condensed Functionalized POSS-Monomers and POSS-Reagents.

In the alkylation process, a POSS-Silanol is dissolved or suspended in a technical grade solvent such as THF, hexane, acetone, alcohol or methylisobutyl ketone, and a stoichiometric amount of functionalized chloro alkyl reagent is subsequently added to the mixture, followed by the addition of an aqueous or alcoholic solution of base (e.g. triethylamine, etc.). Sufficient base should be added to the reaction mixture so as to produce a basic solution (pH 7.1–14). The reaction mixture is stirred at room temperature for 3 hours followed by quenching into a 1N acid hexane solution. During this time the desired functionalized POSS products are recovered in nearly quantitative yield from the hexane layer by solvent extraction, crystallation, or solvent evaporation.

It should be noted that in many cases the resulting functionalized POSS alkyl product is moisture sensitive and has adequate stability for use in solutions and in the solid state. This sensitivity results from the propensity of the silicon-oxygen-carbon bond to hydrolyze and form a silanol (POSS-Silanol) and alcohol. Nevertheless, adequate stability has been observed for several species so as to enable utility as reagents.

Similar to Process I, hydroxide [OH]$^-$ bases are highly effective at concentrations of 1–10 equivalents (the preferred range is 2–5 equivalents) per mole of POSS-Silanol. In particular, hydroxide bases (e.g. sodium hydroxide, potassium hydroxide, lithium hydroxide, benzyltrimethylammonium hydroxide, tetramethyl ammonium hyrdoxide etc) are highly effective in the alkylation of POSS-Silanols. Milder bases such as acetate and carbonate are less effective unless used in combination with a stronger base. It is also recognized that the use of other co-reagents may be used to promote the formation of POSS species from this process.

Specific examples of functionalized chloroalkyl reagents that can be incorporated onto POSS-Silanols include but are not limited to the following:

| R-Y |
| --- |
| Olefinic Chloroalkyls |
| Olefinic Chloroesters |
| Methacryl Chloride |
| Halogated Chloroesters |
| Epichlorohydrine |

Process III: Formation of Polyfunctionalized POSS from Organosilanes.

Process III is similar to Process I and II in that it utilizes base to form functionalized POSS-monomers and POSS-reagents. Process III is unique, however, in that it affords the selective formation of polyfunctionalized POSS nanostructures that are useful as crosslinkers in polymerizations, as dendrimer cores, and a reagents for subsequent chemical derivatization purposes.

The prior art methods of preparing polyfunctionalized POSS molecules from organosilanes involve the acid catalyzed condensation of alkyltrichlorosilanes ($YSiCl_3$) or the silation of spherosilicate species. These processes are inefficient in that they suffer from low yield, produce mixtures of partially functionalized POSS cage species that are often contaminated with polymeric and oligomeric reaction by products. In some cases the undesired by products are produced in as much as 75% yield.

Scheme 4

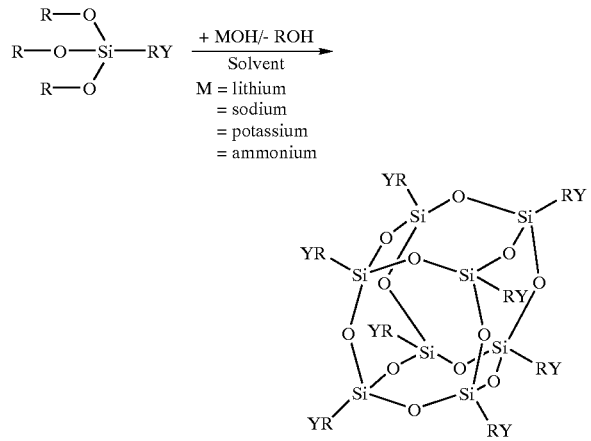

Scheme 4 above illustrates the process of molecular assembly of functionalized silanes into polyfunctionalized POSS-Monomers and POSS-Reagents (Process III).

The molecular assembly process is carried out by first dissolving or suspending a functionalized silane coupling agent in a technical grade solvent such as THF, hexane, acetone, alcohol or methylisobutyl ketone, followed by the addition of an aqueous or alcoholic solution of base. Sufficient base should be added to the reaction mixture so as to produce a basic solution (pH 7.1–14). The reaction mixture is stirred at room temperature for 3 hours followed by crashing into methanol. During this time the desired Functionalized POSS products are separated through filtration of a precipitate or are removed from the reaction solvent by extraction, crystallization, or solvent evaporation.

It should be noted that in many cases the resulting polyfunctionalized POSS product $[(YRSiO_{1.5})_n]_{\Sigma\#}$ is composed of a mixture of different sized cages. The distribution of cage sizes typically spans from #=8–14. This distribution can be controlled to a large extent through variation of temperature and concentration.

Again, hydroxide [OH]⁻ bases are highly effective at concentrations of 1–10 equivalents (the preferred range is 2–5 equivalents) per mole of POSS-Silanol. In particular, hydroxide bases (e.g. sodium hydroxide, potassium hydroxide, lithium hydroxide, benzyltrimethylammonium hydroxide, tetramethyl ammonium hyrdoxide etc) are highly effective in the molecular assembly of Polyfunctional POSS-monomers and POSS-reagents. Milder bases such as acetate and carbonate are less effective unless used in combination with a stronger base. It is also recognized that the use of other co-reagents may be used to promote the formation of POSS species from this process.

Specific examples of functional groups (Y) with a linker group R to an organosilane reagent that can be incorporated onto Polyfunctional POSS-monomers and POSS-reagents using organosilane reagents include but are not limited to the following:

| R-Y |
| --- |
| Hydride |
| Acrylic, Methacrylic, Styrenic |
| Aliphatic and Aromatic Epoxy |
| Alpha Olefin, Vinyl, and Strained Olefins |
| Aliphatic and Aromatic Amine |
| Aliphatic and Aromatic Esters |
| Aliphatic and Aromatic Alcohols |
| Mercapto |
| Aliphatic and Aromatic Imides |
| Aliphatic and Aromatic Halides |
| Cyanate Esters |
| Phosphines and Phosphates |
| Aliphatic and Aromatic Ethers |
| Aliphatic and Aromatic Isocyantes |

EXAMPLES

The following are examples for the cornercapping silation, alkylation of POSS-Silanols using base or acids. Additional examples are given per the assembly and compositions of polyfunctional POSS systems.

Synthesis of $[(EtSiO_{1.5})_7(aminopropylSiO_{1.0})_1]_{\Sigma8}$:

$[(EtSiO_{1.5})_4(R(OH)SiO_{1.0})_3]_{\Sigma7}$ (1.18 g, 2.0 mmole) was dissolved in ethanol (10 mL) followed by addition of aminopropyltrimethoxysilane (354.9 mg, 1.98 mmole) and tetraethylammonium hydroxide (3 drops of a 25% methanol solution). The clear solution was stirred at 20° C. for 12 hours, solvent evaporated, and product washed with acetonitrile and dried in an oven to yield 840 mg, 62% of the product as a white solid.

Synthesis of $[(iOctylSiO_{1.5})_7(aminopropylSiO_{1.0})_1]_{\Sigma8}$:

$[(iOctylSiO_{1.5})_4(iOctyl(OH)SiO_{1.0})_3]_{\Sigma7}$ (25 g, 21.5 mmole) was dissolved in ethanol (105 mL) followed by addition of aminopropyltrimethoxysilane (3.79 g, 21.1 mmole) and tetraethylammonium hydroxide (22 drops (264 mg) of a 25% methanol solution). The clear solution was stirred at 20° C. for 36 hours. The mixture was the concentrated and 30 Ml of methanol was added as a wash. Following decantation the solvent evaporated and product washed recovered to yield 26 g, 97% of the product as a clear oil.

Synthesis of $[(iButylSiO_{1.5})_7(aminopropylSiO_{1.0})_1]_{\Sigma8}$:

$[(iButylSiO_{1.5})_4(iButyl(OH)SiO_{1.0})_3]_{\Sigma7}$ (1000 g, 1.26 mole) was dissolved in ethanol (6.32 L) followed by addition of aminopropyltrimethoxysilane (226.54 g, 1.26 mole) and tetraethylammonium hydroxide (15.2 g, 25.75 mmoles of a 25% methanol solution). The clear solution was stirred at 20° C. for 36 hours. The solvent was evaporated and product washed with acetonitrile, recovered, and dried to yield 1038 g, 94% of the product as a clear white solid.

Synthesis of [(iButylSiO$_{1.5}$)$_7$(aminopropyaminoethyl-SiO$_{1.0}$)$_1$]$_{\Sigma 8}$:

[(iButylSiO$_{1.5}$)$_4$(iButyl(OH)SiO$_{1.0}$)$_3$]$_{\Sigma 7}$ (67.27 g, 85 mmole) was dissolved in ethanol (6.32 L) followed by addition of aminopropylaminoethyltrimethoxysilane (19.24 g, 85 mmole) and tetraethylammonium hydroxide (1.0 g, 1.73 mmoles of a 25% methanol solution). The clear solution was stirred at 20° C. for 36 hours. The solvent was evaporated and product washed with acetonitrile, recovered, and dried to yield 62 g, 80% of the product as a waxy white solid.

Synthesis of [(iButylSiO$_{1.5}$)$_7$(3,3,3-trifluoropropyl-SiO$_{1.0}$)$_1$]$_{\Sigma 8}$:

[(iButylSiO$_{1.5}$)$_4$(iButyl(OH)SiO$_{1.0}$)$_3$]$_{\Sigma 7}$ (86.9 g, 0.11 mole) was dissolved in ethanol (550 mL) followed by addition of 3,3,3-trifluoropropyltrimethoxysilane (24 g, 0.11 mole) and benzyltrimethylammonium hydroxide (1.37 g, 3.3 mmoles of a 40% methanol solution). The clear solution was stirred at 20° C. for 12 hours. The reaction was quenched into dilute HCl and the solvent was evaporated and product washed with methanol, and dried to yield 90.5 g, 90% of the product as a white solid.

Synthesis of [(iButylSiO$_{1.5}$)$_7$(MeOSiO$_{1.0}$)$_1$]$_{\Sigma 8}$:

[(iButylSiO$_{1.5}$)$_4$(iButyl(OH)SiO$_{1.0}$)$_3$]$_{\Sigma 7}$ (1.58 g, 2.0 mmole) was dissolved in hexane (10 mL) followed by addition of tetramethoxysilane (334.84 mg, 2.2 mmole) and tetrabutylammonium hydroxide (1 drop, of a 1M methanol solution). The clear solution was stirred at 20° C. for 12 hours. The reaction was then quenched by addition of dilute HCl, then solvent was evaporated and product washed with methanol, and product recovered, and dried to yield 1.46 g, 86% of the product as a clear waxy solid.

Synthesis of [(iButylSiO$_{1.5}$)$_7$(methacrylpropylSiO$_{1.0}$)$_1$]$_{\Sigma 8}$:

[(iButylSiO$_{1.5}$)$_4$(iButyl(OH)SiO$_{1.0}$)$_3$]$_{\Sigma 7}$ (15.8 g, 20 mmole) was dissolved in methanol (100 mL) followed by addition of methacrylpropyltrimethoxysilane (4.97 g, 20 mmole) and tetrabutylammonium hydroxide (20 drops (240 mg) of a 1M methanol solution). The clear solution was stirred at 20° C. for 12 hours. The reaction was then quenched by addition of dilute HCl, the product recovered by filtration, rinsed with additional methanol, and dried to yield 13.9 g, 71% of the product as a clear waxy white solid.

Synthesis of [(iButylSiO$_{1.5}$)$_7$(styrylethylSiO$_{1.0}$)$_1$]$_{\Sigma 8}$:

[(iButylSiO$_{1.5}$)$_4$(iButyl(OH)SiO$_{1.0}$)$_3$]$_{\Sigma 7}$ (0.79 g) was dissolved in ethanol (10 mL) followed by addition of styrylethyltrimethoxysilane (266.64 mg) and benzyltrimethylammonium hydroxide (1 drop of a 40% methanol solution). The clear solution was stirred at 20° C. for 12 hours. The reaction was then quenched by addition of dilute HCl, the solvent was removed and the product recovered by filtration, rinsed with additional methanol, and dried to yield 572 mg, 61% of the product as a white free flowing solid.

Synthesis of [(iButylSiO$_{1.5}$)$_7$(mercaptoSiO$_{1.0}$)$_1$]$_{\Sigma 8}$:

[(iButylSiO$_{1.5}$)$_4$(iButyl(OH)SiO$_{1.0}$)$_3$]$_{\Sigma 7}$ (118.5 g, 0.15 mole) was dissolved in ethanol (750 mL) followed by addition of 3-mercaptotrimethoxysilane (29.45 g, 0.15 mole) and benzyltrimethyl ammonium hydroxide (1.87 g, 4.48 mmoles) of a 40% methanol solution). The clear solution was stirred at 20° C. for 24 hours. The reaction was quenched with dilute HCl, the solvent was evaporated and the residue was washed with methanol and filtered and dried to yield 105 g, 78% of a white solid.

Synthesis of [(iButylSiO$_{1.5}$)$_7$(glycidalSiO$_{1.0}$)$_1$]$_{\Sigma 8}$:

[(iButylSiO$_{1.5}$)$_4$(iButyl(OH)SiO$_{1.0}$)$_3$]$_{\Sigma 7}$ (900 g, 1.137 mole) was dissolved in ethanol (5680 mL) followed by addition of 2-glycidoxypropyltrimethoxysilane (268.7 g, 1.137 mole) and benzyltrimethyl ammonium hydroxide (14.2 g, 34 mmoles) of a 40% methanol solution). The clear solution was stirred at 20° C. for 24 hours. The solvent was evaporated and the residue was washed with methanol and filtered and dried to yield 795 g, 75% of a white sticky/waxy solid.

Synthesis of [(iButylSiO$_{1.5}$)$_7$(3,4-epoxycyclohexylethyl-SiO$_{1.0}$)$_1$]$_{\Sigma 8}$:

[(iButylSiO$_{1.5}$)$_4$(iButyl(OH)SiO$_{1.0}$)$_3$]$_{\Sigma 7}$ (1000 g, 1.264 mole) was dissolved in ethanol (6320 mL) followed by addition of epoxycyclohexylethyltrimethoxysilane (311.3 g, 264 mole) and benzyltrimethyl ammonium hydroxide (15.8 g, 37,8 mmoles) of a 40% methanol solution). The clear solution was stirred at 20° C. for 36 hours. The solvent was evaporated and the residue was washed with methanol and filtered and dried to yield 974.3 g, 82% of a white sticky/waxy solid.

Synthesis of [(iButylSiO$_{1.5}$)$_7$(3,4-dihydroxycyclohexyl-ethylSiO$_{1.0}$)$_1$]$_{\Sigma 8}$:

[(iButylSiO$_{1.5}$)$_4$(iButyl(OH)SiO$_{1.0}$)$_3$]$_{\Sigma 7}$ (15.8 g, 20 mmole) was dissolved in ethanol (100 mL) followed by addition of epoxycyclohexylethyltrimethoxysilane (4.93 g, 20 mmole) and benzyltrimethyl ammonium hydroxide (20 drops (250 mg) of a 40% methanol solution). The clear solution was stirred at 20° C. for 12 hours. Then 50 ml of tetrahydrofuran was added followed by 75 drops of 10 molar HCl and 2.5 mL of water. After stirring for 3 hours the solvent was evaporated and the residue was washed with acetonitrile and dried to yield 15.93 g, 83% of the product as a fine white crystalline solid.

Synthesis of [(PhSiO$_{1.5}$)$_7$(methacrylpropylSiO$_{1.0}$)$_1$]$_{\Sigma 8}$:

[(PhSiO$_{1.5}$)$_4$(Ph(OH)SiO$_{1.0}$)$_3$]$_{\Sigma 7}$ (930 mg, 1.0 mmole) was dissolved in THF (10 mL) followed by adding the silane (248.4 mg, 1.0 mmole) and methanesulfonic acid (3 drops). The clear solution was heated at 60° C. for 48 hours and quenched by water. Hexane (3 mL) was added to the quenched mixture and the top layer was separated and concentrated. A mixture solvent (MeOH/CH3CN=10/1) was added to the concentrated material to form a slurry. The slurry was filtered and dried to give the product as white solid (135 mg, 12.5%). 1H NMR (CDC13, 500 MHz) ∂ (ppm): 1.00 (m, 2H, Si—CH2), 1.98 (br s, 5H, —CH3 and C—CH2-C), 4.20 (m, 2H, O—CH2), 5.57 (s, 1H, C=CHa), 6.14 (s, 1H, C=CHb), 7.43–7.83 (m, 35H, —Ph); 13C NMR (CDC13, 125 MHz) ∂ (ppm): 8.23, 18.28, 22.19, 66.33, 125.25, 127.25, 127.90, 130.12, 130.25, 130.77, 130.81, 134.12, 134.17, 136.36, 167.35; 29Si NMR (CDC13, 90.6 MHz) d (ppm): −78.41 (3), −78.07 (4), −65.06 (1).

Synthesis of [(PhSiO$_{1.5}$)$_7$(HSiO$_{1.0}$)$_1$]$_{\Sigma 8}$:

[(PhSiO$_{1.5}$)$_4$(Ph(OH)SiO$_{1.0}$)$_3$]$_{\Sigma 7}$ (9.30 g, 10.0 mmoles) was dissolved in THF (50 mL). trimethoxysilane (1.34 g, 11.0 mmoles) was then added to the solution followed by adding MeSO3H (5 drops). The solution was stirred at ambient temperature for 8 hours and the reaction quenched by H2O. The top organic layer was collected and the solvent evaporated. The residue solid was washed in MeOH, the slurry filtered, the solid pad rinsed with MeOH, and dried to give the product as white solid, 8.17 g, 85.5%. 1H NMR (CDCL3, 500 MHz) ∂ (ppm) 4.51 (s, 1H), 7.33–7.50 (m, 21H), 7.71–7.79 (m, 14H).

Synthesis of [(PhSiO$_{1.5}$)$_7$(vinylSiO$_{1.0}$)$_1$]$_{\Sigma 8}$:

[(PhSiO$_{1.5}$)$_4$(Ph(OH)SiO$_{1.0}$)$_3$]$_{\Sigma 7}$ (931 mg, 1.0 mmole) was dissolved in THF (5 mL) followed by addition of vinyltrimethoxysilane (148.2 mg, 1.0 mmole) and methanesulfonic acid (9 drops). The solution was stirred at ambient temperature for 24 hours and heated at 50° C. for additional 5 days. The reaction was cooled and the solvent was evaporated, the residue solid washed in MeOH, the slurry filtered, the solid pad rinsed with MeOH, and dried to give the product as white solid, 500.0 mg, 50.9%. 1H NMR (CDCL3, 500 MHz) ∂ (ppm) 6.16 (dd, J=21.7, 12.2 Hz, 1H), 6.24 (d, J=12.2 Hz, 1H), 6.25 (d, J=21.7 Hz, 1H), 7.41–7.56 (m, 21H), 7.83–7.90 (m, 14H).

Synthesis of $[(iBuSiO_{1.5})_8(norbornenylethyl)(Me)_2SiO_{1.0})_1]_{\Sigma 9}$:

$[(iBuSiO_{1.5})_6(iBu(OH)SiO_{1.0})_2]_{\Sigma 8}$ (2.0 g, 2.24 mmole) was dissolved in THF (20 mL) followed by addition of norbornenylethyldimethylchloro silane (1.03 g , 4.8 mmole) and triethylamine (678 mg). The solution was stirred at ambient temperature for 15 hours. The reaction was filtered and the filtrate was evaporated, the residue solid washed in hexane, and dried to give the product as pale yellow oil, 2.77 g, 99%. 1H NMR (CDCL3, 500 MHz) ∂ (ppm) 6.09–5.89 (4H, mm), 2.79–2.73 (4H, mm), 1.91–1.81 (14H, mm), 0.98–0.94 (56H, mm), 0.61–0.53 (20H, mm), 0.13–0.08 (12H, mm).

Synthesis of $[(3\text{-methacryloxypropylSiO}_{1.5})_n]_{\Sigma n}$:

3-methacryloxypropyltrimethoxysilane (1241.75 g, 5.0 mole) was dissolved in THF (5000 mL) followed by addition of water (135 g, 7.5 mole) and tetramethylammonium hydroxide (20 ml, 55.7 mmoles, from a 25 wt % aqueous solution). The solution was stirred and reacted for 24 hours at ambient temperature and was then quenched with dilute HCl and the solvent removed. The clear brown product was filtered, and dried to 896 g in quantitative yield.

Synthesis of $[(\text{epoxycyclohexylethylSiO}_{1.5})_n]_{\Sigma n}$:

2-(3,4-Epoxycyclohexyl)ethyltrimethoxysilane (123.19 g, 0.5 mole) was dissolved in THF (500 mL) followed by addition of water (13.5 g, 0.75 mole) and tetraethylammonium hydroxide (5.89 g, 0.01 mole, from a 25 wt % methanol solution). The solution was stirred and refluxed for 12 hours and the solvent removed. The clear brown product was dried to give 86 g in 97% yield.

What is claimed is:

1. A process of functionalizing a silsesquioxane, comprising:
   mixing a POSS-Silanol in a solvent with a member selected from the group consisting of silane coupling agents, chloroalkyls, and chloroesters, and a hydroxide base to produce a basic mixture.

2. The process of claim 1, wherein only one corner of the silsesquioxane is functionalized by the process.

3. The process of claim 2, wherein the member is a silane coupling agent and the functionalized silsesquioxane is selected from the group consisting of fully condensed functionalized POSS-monomers, fully condensed functionalized POSS-reagents, incompletely condensed functionalized POSS-monomers, and incompletely condensed functionalized POSS-reagents.

4. The process of claim 3, wherein the silane coupling agent is an organosilane.

5. The process of claim 1, wherein the base is selected from the group consisting of sodium hydroxide, potassium hydroxide, lithium hydroxide, benzyltrimethyl ammonium hydroxide, tetramethyl ammonium hydroxide, tetraethyl ammonium hydroxide, and tetrabutyl ammonium hydroxide, and wherein the concentration of the base is 1 to 10 percent molar equivalents per mole of the POSS-Silanol.

6. The process of claim 5, wherein the concentration of the base is 2 to 5 percent molar equivalents per mole of the POSS-Silanol.

7. The process of claim 6, further comprising the steps of:
   stirring the mixture in room temperature;
   crashing the stirred mixture into methanol; and
   isolating the functionalized silsesquioxane.

8. The process of claim 1, wherein the member is a choroalkyl or a chloroester and the functionalized silsesquioxane is selected from the group consisting of incompletely condensed functionalized POSS-monomers and incompletely condensed functionalized POSS-reagents.

9. The process of claim 8, wherein the base is selected from the group consisting of sodium hydroxide, potassium hydroxide, lithium hydroxide, benzyltrimethyl ammonium hydroxide, tetramethyl ammonium hydroxide, tetraethyl ammonium hydroxide, and tetrabutyl ammonium hydroxide, and wherein the concentration of the base is 1 to 10 percent molar equivalents per mole of the POSS-Silanol.

10. The process of claim 9, wherein the concentration of the base is 2 to 5 percent molar equivalents per mole of the POSS-Silanol.

11. The process of claim 10, further comprising the steps of:
   stirring the mixture in room temperature;
   quenching the stirred mixture into a 1N acid hexane solution; and
   isolating the functionalized silsesquioxane.

* * * * *